United States Patent [19]

Baylor et al.

[11] 4,337,550
[45] Jul. 6, 1982

[54] HOG SPLITTER

[75] Inventors: David R. Baylor, Belding, Mich.; Byron J. Getter, Troy, Ohio

[73] Assignee: Wolverine World Wide, Inc., Rockford, Mich.

[21] Appl. No.: 204,939

[22] Filed: Nov. 7, 1980

[51] Int. Cl.³ .............................................. A22B 5/20
[52] U.S. Cl. ..................................................... 17/23
[58] Field of Search .................... 17/23; 83/455, 471.1

[56] References Cited

U.S. PATENT DOCUMENTS 3,916,482  11/1975  Kvilhaug ................................. 17/23
4,262,388  4/1981   Durand et al. ...................... 17/23 X

FOREIGN PATENT DOCUMENTS 222944  10/1968  Sweden .................................... 17/23

Primary Examiner—Willie G. Abercrombie
Attorney, Agent, or Firm—Price, Heneveld, Huizenga and Cooper

[57] ABSTRACT

A mechanized hog carcass splitter having a power saw extensible into an inverted hog carcass, anchored at the shoulders and retained at an acute angle to vertical, the saw being mechanically advanceable vertically with simultaneous vertical advancement of a configurated, carcass-back retainer-stop controllably spaced from the extended saw, the advancement of both being at the acute angle to vertical, splitting the carcass including the backbone without splitting the skin.

15 Claims, 6 Drawing Figures

HOG SPLITTER

BACKGROUND OF THE INVENTION

This invention relates to a hog carcass splitter.

Hog carcass butchering techniques used for many years involve, after the steps of decapitation, removal of feet, full length slitting along the belly, and evisceration, the step of cutting the carcass through the backbone into two halves. From each separate half of so-called "hog-side", the rib cage and loins are pulled, any other cuts of meat taken, and the skin removed from the bacon and fat on a skinning machine. The two pieces of skin can be used for fabrication of footwear or other articles. It is very preferable to have one large piece of skin from the hog carcass rather than two smaller ones. Hence, in recent years the butchering technique has been modified such that, instead of splitting the carcass into halves, a highly skilled workman carefully cuts the backbone in two from the inside, using a special powered hand saw, without cutting through the skin over the exterior of the backbone. The removal of the rib cage and loins then includes removal of the two parts of the severed backbone therewith, with the bacon and fat back being subsequently separated from the "double side" skin on a drum-type double-side skinner as in U.S. Pat. No. 3,310,085, or a plate-type double-side skinner as in U.S. Pat. No. 3,640,325. A fabricator of articles from the tanned skins, such as the assignee herein, much prefers these double side skins to optimize product quality and maximize area of skin usage. However, the hog processors are reluctant to take the added time and care, and pay the considerable expense to have skilled personnel perform the special processing. In fact, such personnel is often of the highest skill in the plant, and therefore among the highest on the pay scale. Even such a highly skilled person requires considerable time to perform his task, and at some risk. This can result in holding up the entire processing line. There has been needed a technological development enabling hog processors to obtain double sides without the time and expense of skilled manual processing for carcass splitting.

SUMMARY OF THE INVENTION

A hog carcass splitter which rapidly, safely, and controllably splits a suspended hog carcass through the backbone but not through the skin, but without the need for a highly skilled operator. The apparatus specially positions the carcass, anchors the carcass in such position, and dynamically supports the zone of the backbone being cut. Anchoring of the carcass is achieved by mounted and actuable opposing puncture pin elements which forceably penetrate the shoulders of the inverted carcass. The backbone support comprises a configurated retainer stop preferably in the form of a hyperboloid roller, which advances along the length of the exterior of the carcass backbone simultaneously with and opposite to advancement of a power saw interiorly of the carcass. During operation, the saw is initially extensible toward the carcass, advanceable therealong, and then retractable therefrom.

An important object of this invention is to enable repeated, rapid, dependable, and safe mechanical splitting of the carcass at the backbone without splitting the skin along the backbone, thereby enabling hog processors to economically and safely achieve double side skins, yet without finding and paying for specially skilled labor.

DESCRIPTION OF THE PREFERRED EMBODIMENT

Figure 1:
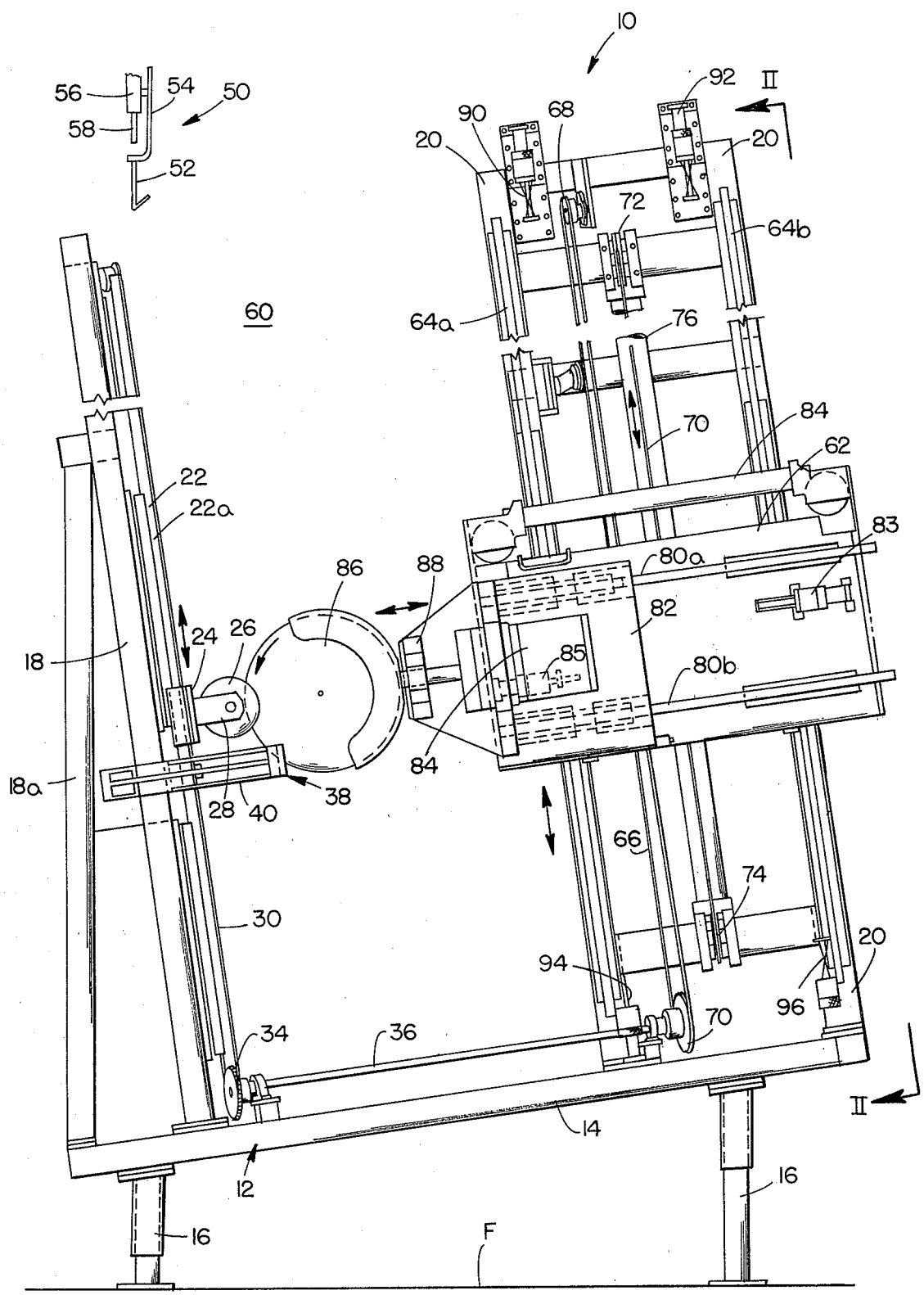
FIG. 1 is a side elevational view depicting the preferred embodiment of this invention.

Referring now to the drawings, the complete assembly 10 there depicted preferably employs a support framework 12 which includes a lower platform 14 mounted on a plurality of telescopically adjustable legs 16, with spaced upright supports 18 and 20 projecting up from platform 14 on opposite sides of the framework. Each of supports 18 and 20 is of generally rectangular shape, formed by an inverted U-shaped structure. The upright supports 18 and 20 straddle a space 60 therebetween. Support 18 has a diagonal brace 18a and support 20 has a diagonal brace 20a. Support 18 has a face toward support 20, while support 20 has a side edge toward support 18, offset from the vertical center line of support 18 so that saw 86 is at the vertical center line of support 18 as will be understood. Both supports 18 and 20 are at a small acute angle relative to the vertical, preferably about 8°, being parallel with each other. This acute angle is shown to occur by having platform 14 normal thereto, i.e. also at the acute angle to the horizontal floor surface F on which the structure is mounted.

Figure 4:
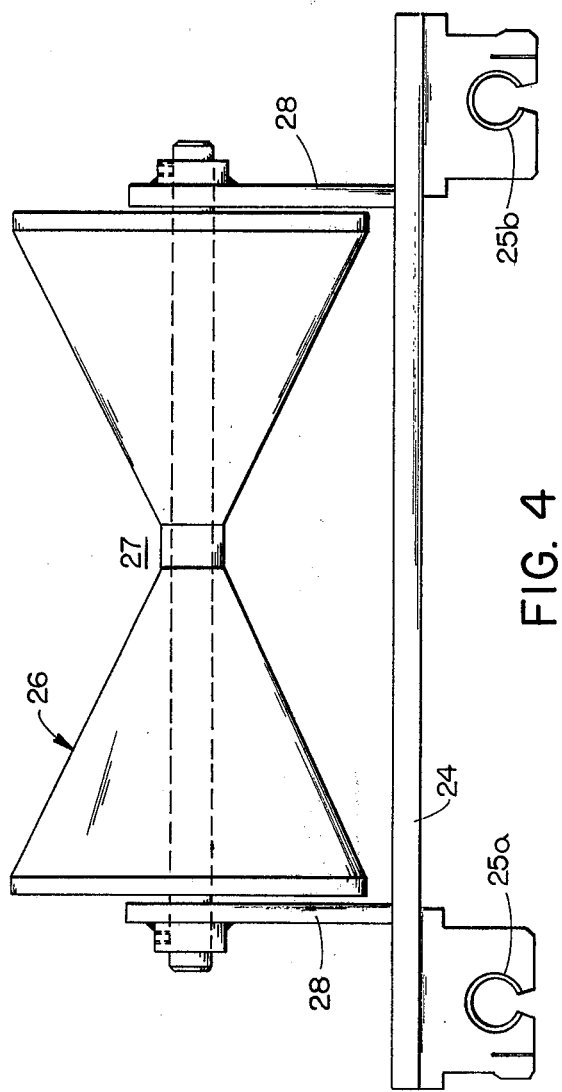
FIG. 4 is an enlarged plan view of the back support of the apparatus.

Mounted on support 18 is a vertical guide 22 formed of a pair of parallel spaced upright guide bars 22a and 22b at the acute angle to the vertical. Movable vertically up or down along these guide bars is a movable back carriage 24 with collars 25a and 25b (FIG. 4) that slidably interfit with, i.e. receive, guide bars 22a and 22b, and mounting a carcass-back retainer-stop roller 26 with brackets 28. This roller is configurated to have a back receiving recess 27 around its periphery between its ends, the roller having a pair of frustoconical end portions having the small ends thereof interconnected by a small cylindrical central portion, the composite forming a hyperboloid configurated element. The back carriage 24 is attached to one portion of a reciprocatory, vertical drive chain 30 extending from the top to the bottom of support 18 and around sprockets 32 and 34 at the top and bottom of the frame, respectively. Lower sprocket 34 is mounted on one end of a cross shaft 36.

Fixedly mounted on support 18 approximately one-third of the way from the bottom of the support, i.e. two-thirds of the way down the top, is an anchor subassembly 38. This anchor subassembly includes a rigid anchor bracket 40 extending the width of support 18 and defining a V-shaped recess 41 in the central portion thereof. A pair of oppositely actuated extensible-retractable pointed puncture pin elements 42a and 42b are projectable through openings in the diagonal faces 40a and 40b of anchor bracket 40 into this recess 41 from opposite sides thereof. These shoulder puncture elements have motive power means such as fluid cylinders (not shown) or the equivalent for extending them to puncture the shoulders of an inverted hog carcass in recess 41 pressing against surfaces 40a and 40b and between the oppositely acting pins. This serves to anchor, i.e. restrain the lower end of the inverted hog carcass during the splitting operation, the upper end being held by the gam hooks. A rear opening 43 behind the central portion of this anchor bracket 40 allows retainer stop roller 26 to vertically move up or down past it.

The guide elements 22a and 22b and the supporting framework are located and oriented to be generally below a hog carcass suspension means 50 of conventional type. It includes a gam hook 52 for suspending the hog by its gams and mounted on a bracket 54 suspended on a trolley 56 movable along a track 58 for advancing the carcass to the splitter and subsequently away therefrom. The guide 22 is positioned so that the lower portion thereof extends beneath suspension means 50. The acute angle to vertical of the guides causes the hog carcass to be at the small angle, so that the weight of the hog carcass rests against the structure. This assures the carcass being in the proper location at the start, with the backbone adjacent the tail against the center of roller 26 and the shoulders against the recess 41 of anchor bracket 40.

On the opposite side of the carcass receiving space 60 from the guide 22 and anchor subassembly 38 is the support framework 20 for vertical saw carriage 62. This carriage is movable vertically up and down on a pair of tracks 64a and 64b. Tracks 64a and 64b are parallel to guide 22, i.e. at the same acute angle to vertical of about 8° or so. The carriage is attached to a second vertical reciprocatory chain 66 extending around upper and lower sprockets 68 and 70 respectively. Lower sprocket 70 is mounted on the opposite end of shaft 36 from sprocket 34 so that movement of one of chains 30 and 66 results in simultaneous movement of a like amount of the other chain for reasons to be explained hereinafter.

Carriage 62 is driven up and down by a cable drive including a reciprocatory cable 70 to which carriage 62 is attached, the cable traveling around a pair of pulleys 72 and 74 at the top and bottom of the structure and being attached to a fluid cylinder 76 or the equivalent for power.

Carriage 62 has a pair of generally horizontal guideways 80a and 80b mounted thereon, these being at a small acute angle to the horizontal so as to be basically perpendicular to guides 22a and 22b. Supported by these guideways and transversely movable therealong is a transverse saw carriage 82. It is shiftable back and forth on the guideways by a fluid cylinder 84 connected at its opposite ends between transverse carriage 82 and vertical carriage 62. Mounted on transverse carriage 82 is a motor driven saw including a motor 84, preferably electric, a rotational circular splitting saw 86, and a gear box 88 connecting the output drive from motor 84 to vertically oriented saw 86. Saw 86 has its axis of rotation horizontally oriented, and is aligned with the vertical center line of support 18, roller 26, and anchor means 38. Actuation of the fluid cylinder 84 to extend it therefore causes transverse carriage 82, motor 84, and saw 86 to be advanced toward guides 22a and 22b, toward retainer stop roller 26 specifically, with which it is in alignment, and into the center of a hog carcass. This extension of the saw shifts it into cutting relationship with the carcass suspended from gam hooks 52 and resting against roller 26 and anchor means 38. Saw 86 and roller 26 are kept in alignment as they are moved vertically up or down by the interconection of chains 30 and 66 through sprockets 34 and 70 and common shaft 36.

At the outer and inner ends of carriage 62 are shock absorber elements 83 and 85 to cushion the transverse carriage movements.

At the top of the framework 20 is a pair of shock absorbers 90 and 92 to cushion the braking action of the vertical carriage at its upper limit, with a like pair of shock absorbers 94 and 96 at the bottom end of the framework.

When the saw is extended toward roller 26, it is set to cause its blade periphery to be approximately one inch from the smallest diameter central portion of roller 26. During actual splitting, the saw blade periphery becomes spaced from the skin of the carcass approximately three-eighths of an inch or so since the carcass tends to move out toward the saw a fraction of an inch.

Figure 3A:
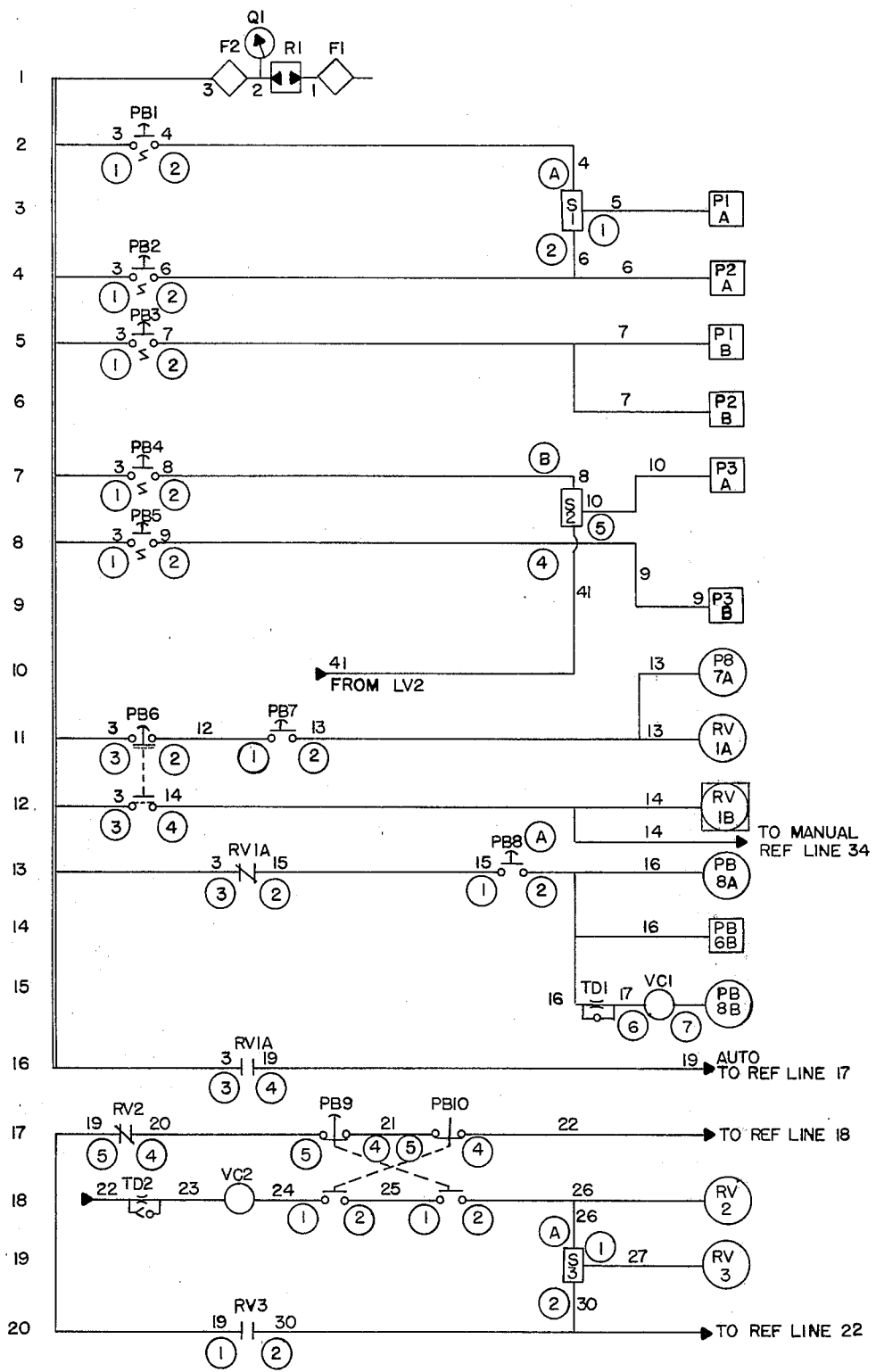
FIGS. 3A and 3B constitute a pneumatic schematic diagram for the apparatus in FIGS. 1 and 2.
Figure 3B:
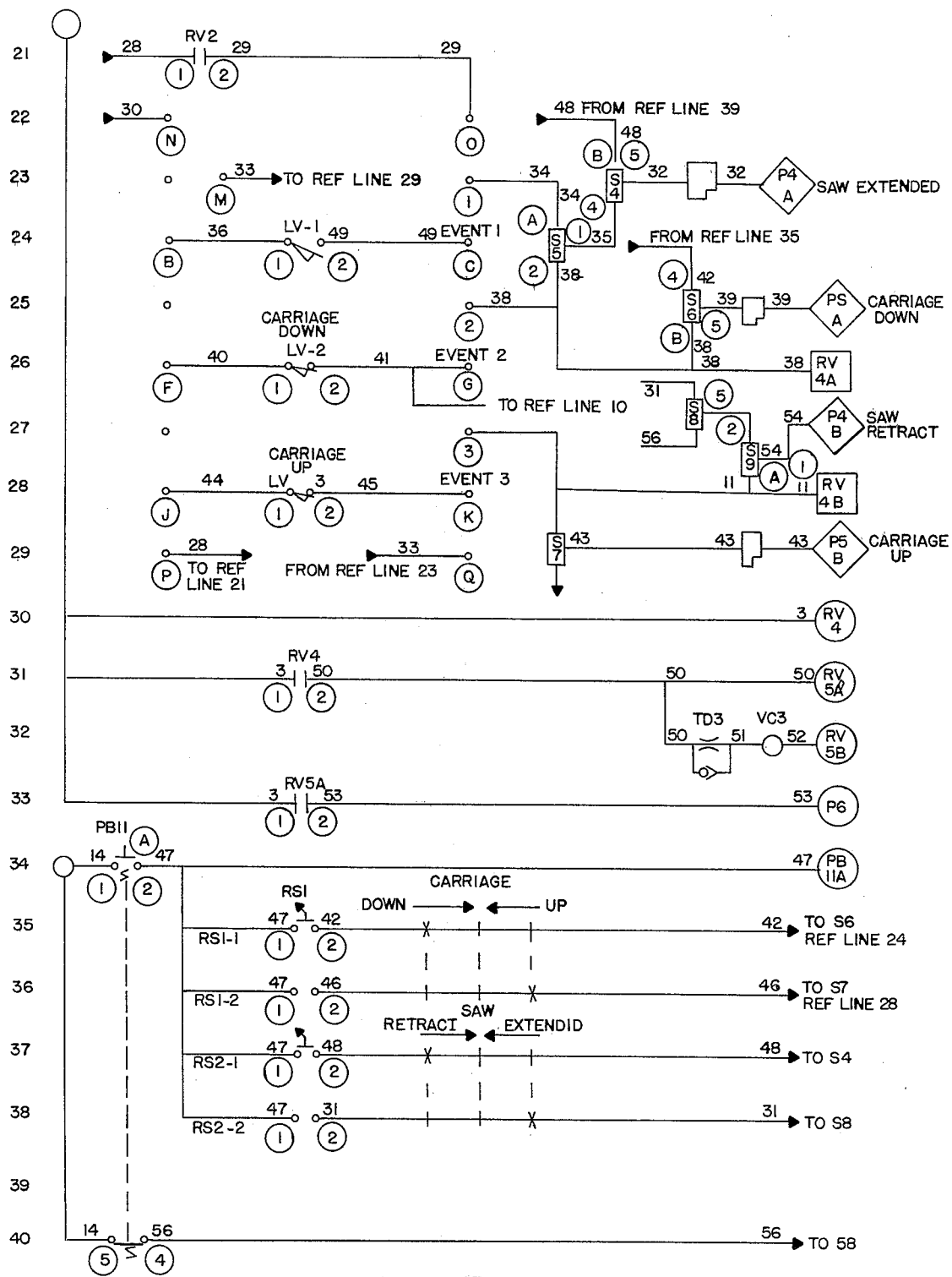
Figure 5:
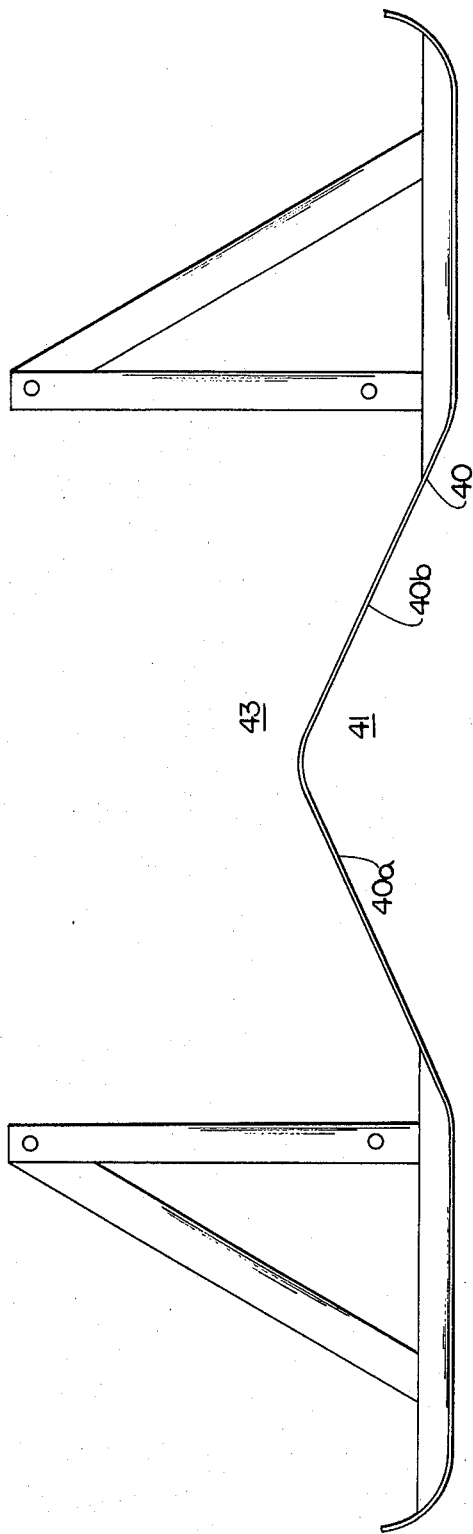
FIG. 5 is an enlarged plan view of the anchor bracket.

Operation of the apparatus is controlled by a person who either actuates the components sequentially or actuates a logic system which itself actuates the components sequentially. In FIGS. 3A and 3B is depicted in schematic form, the preferred pneumatic logic system which selectively allows either of these two possibilities. The sequential functions of the components of this logic system are set forth hereinafter.

The basic sequence of the operation is as follows. A hog carcass which has been decapitated, dehocked, slit, and eviscerated is advanced in inverted position, suspended by its gams on gam hooks 52 to space 60, with the slit belly opening oriented toward the saw. At this point, roller 26 is at the top of guide 22 in abutment with the hams, and its center aligned with the carcass backbone adjacent the tail. The weight of the carcass causes its shoulders to be received within recess 41 of anchor means 38, and in abutment with surfaces 40a and 40b of anchor bracket 40.

Figure 2:
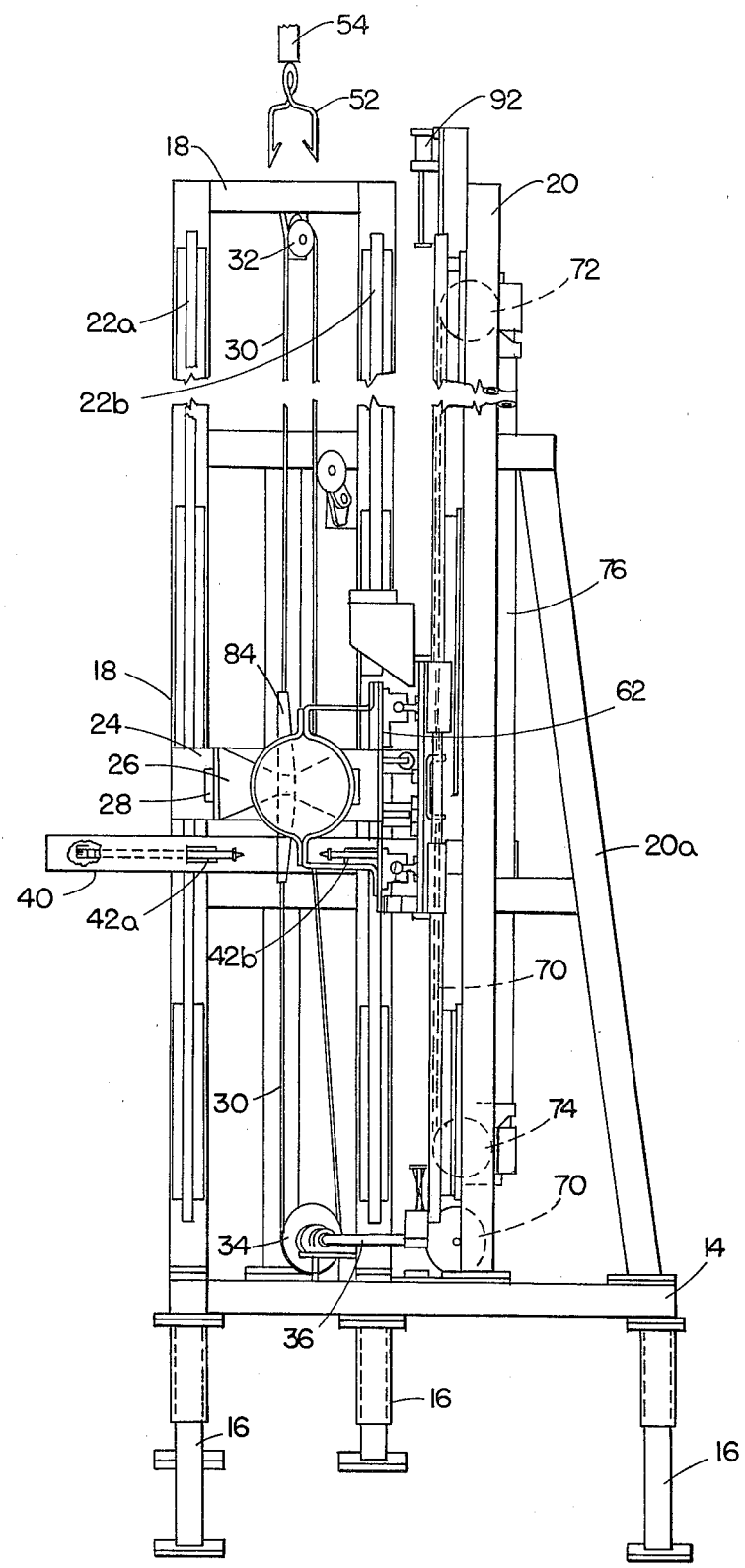
FIG. 2 is an end elevational view taken on the plane II-II of FIG. 1.

Next, puncture pin elements (FIG. 2) are power shifted toward each other to penetrate the carcass shoulders and anchor the carcass. The rotating power saw 86 is then extended transversely toward back roller 26 by actuation of cylinder 84 which moves transverse carriage 82 on guideways 80a and 80b. This causes the saw periphery to advance into the carcass through the backbone, to within about one inch of the center of roller 26 whereat the saw or cutter advance is stopped by actuation of limit valve LV-1. The carcass tends to be pulled toward the saw by its cutting action a fraction of an inch so that the skin and small amount of fat to a thickness of about $\frac{3}{8}''$ to $\frac{1}{2}''$ are all that is not split. The saw and roller are then vertically advanced downwardly by drive cable 70 to split the carcass over its length, without splitting the skin. As the saw and roller pass anchor bracket 40, the roller momentarily engages the thin bracket. At the bottom of the stroke, the saw is transversely retracted with transverse carriage 82, and both the saw carriage 62 and roller carriage 24 are vertically raised to return to the starting position, by reversing cable drive 70.

The control of these sequential functional steps is achieved either by manual actuation of push buttons or the like, or automatic actuation as follows:

SEQUENCE OF OPERATION

ENERGIZING MACHINE

1. Push block and bleed valve to "passing" position.
   A. Air pressurizes infeed side (Port #1) of following pushbuttons:
      1. PB-1, "Index Cam 90°"
      2. PB-2, "Index Cam 180°"
      3. PB-3, "Retract Index Cam"
      4. PB-5, "Hog Restraint Closed" (Anchoring puncture pins)
      5. PB-4 "Hog Restraint Open"
      6. PB-6, "Emergency Stop"
   B. Air pressurizes infeed side (Port #3) of relay valve "RV1."

AUTOMATIC CYCLE

Note: Saw carriage at top of machine with saw retracted at start of cycle.
1. Operator pushes PB-7 "Auto Cycle" momentarily making RV1 side "A" becomes passing, locking machine in automatic mode.
2. Operator pushes PB-1 "Index Cam 90°"
   A. Power valve P1—Side "A" becomes passing—Hog carcass moves into position.
3. Operator pushes PV-5 "Hog Restraint Closed"
   A. Power valve P3—Side "A" becomes passing—Hog carcass is clamped in position ready for splitting.
4. Operator pushes PB-9 and PB-10 "Cycle Start" simultaneously and momentarily.
   A. RV-2 and RV-3 become passing—P4—"A" becomes passing-saw starts forward into hog carcass, activating proximity switch which starts saw blade motor—saw extended making LV-1 passing.
   B. Event #1—LV-1 Held passing—making RV-4 passing.
   C. RV-4 Held passing—P5—"A" becomes passing—vertical saw carriage travels downward—splitting hog carcass. Carriage reaches bottom—activates LV-2.
   D. Event #2—LV-2 activated momentarily—P4 "B" saw retracts, P5 "B"—carriage starts up, P3 "A"—"Restraints open"
   E. Event #3—RV4 "B" becomes passing making RV5 "A" passing activating P6 passing—Saw blade washdown activated and times out—saw carriage reaches top making LV-3.
   F. LV-3 resets automatic mode—machine ready for next cycle.
5. Operator pushes PB-2 "Index Cam 180°".
   A. Power valve P1—side "A" becomes passing—Hog moves out of machine.
6. Operator pushes PB-3 "Retract Index Cam"
   A. Power valves P2 and P3—sides "B" becomes passing—retracts ready to index next hog into position.

MANUAL CYCLE

Note: Saw carriage at top of machine with saw retracted at start of cycle.
1. Operator pushes PB-11 "Manual Cycle" momentarily locking machine in manual mode.
2. Operation pushes PB-1 "Index Cam 90°".
   A. Power valve P1—side "A" becomes passing—Hog carcass moves into position.
3. Operator pushes PB-5 "Hog Restraint Closed".
   A. Power valve P3—side "B" becomes passing—Hog carcass is clamped in position ready for splitting.
4. Operator rotates selector switch RS-2 to "Extend".
   A. Power valve P4—side "A" becomes passing—saw moves into hog activating proximity switch starting saw blade motor—saw starts splitting hog.
5. Operator rotates selector switch RS-1 to "Down".
   A. Power valve P5—side "A" becomes passing—saw carriage moves downward—splitting hog carcass—saw carriage bottoms out.
6. Operator rotates selector switch RS-2 to "Retract".
   A. Power valve P4—side "B" becomes passing—saw carriage backs out of hog carcass. Relay valve RV-4 becomes passing activating RV-5—side "A"—Saw blade washdown activated and times out.
7. Operator rotates selector switch "RS-1" to "Up".
   A. Power valve P5—side "B" becomes passing—saw carriage moves up to top of machine—when reaching top makes limit LV-3.
8. LV-3 resets machine in automatic mode—ready for next cycle.
9. Operator pushes PB-4—"Hog Restraint Open".
   A. Power valve P3—side "A" becomes passing—"Hog Restraint Open" releases hog carcass.
10. Operator pushes PB-2—"Index Cam 180°".
    A. Power valve P2—side "A" becomes passing—Hog carcass moved out of machine.
11. Operator pushes PB-3 "Retract Index Cam".
    A. Power valves P2 and P3—sides "B" becomes passing-retracts ready to index next hog carcass into position.

EMERGENCY STOP

1. Operator pushes PB-6 "Emergency Stop"
   A. Relay valve RV1—side "B" becomes passing—all functions on machine stop. p1 2. Operator pushes PB-8 "Reset"
   A. Power valve PB-8 sides "A" becomes passing—times out.
3. Operator pushes PB-11 "Manual"—Then goes through manual steps to return machine to original start position—see MANUAL CYCLE.

The novel apparatus has been extensively tested on different types of hog carcasses and found effective. Conceivably, particular installations might indicate certain modifications of the depicted apparatus to be beneficial, while still employing the inventive concept. The invention is not intended to be limited to the depicted details but only by the scope of the appended claims and the reasonably equivalent structures to those defined therein.

The embodiments of the invention in which an exclusive property or privilege is claimed are defined as follows:

1. A hog carcass splitter to be used in combination with suspension means for suspending hog carcasses in inverted position, comprising:
   an upright guide tilted at an acute angle to the vertical such that the bottom thereof extends toward a location beneath the suspension means;
   a configurated carcass-back retainer stop movable vertically along the length of said tilted guide;

carcass anchor means positioned along said guide for anchoring an inverted hog carcass in position;

an upright track spaced from said guide to be on the opposite side of the suspension means therefrom;

a cutter mounting carriage movable vertically along said track; a cutter supported by said carriage; said cutter being extensible toward said guide to a predetermined spacing from said retainer stop, and retractable away from said guide; and coordinate drive means to said retainer stop and said carriage for advancement thereof simultaneously in alignment with each other, along said guide and track respectively.

2. The hog carcass splitter in claim 1 characterized by said carcass anchor means including mounted, actuable, puncture elements for puncturing and restraining the carcass when actuated.

3. The hog carcass splitter in claim 2 characterized by means forming a recess for receiving the shoulders of a hog carcass, said puncture elements being on opposite sides of said recess and actuable toward each other for penetrating the carcass shoulders and thereby anchoring the hog carcass in said recess.

4. The hog carcass splitter in claim 2 characterized by said retainer stop being configured to receive a portion of the back area of a hog carcass and form a stop for the backbone movable along the backbone simultaneously with said cutter as said cutter advances through the carcass and splits the backbone.

5. The hog carcass splitter in claim 4 characterized by said retainer stop comprising a roller.

6. The hog carcass splitter in claim 4 characterized by said retainer stop comprising a hyperboloid shaped roller having a peripheral cavity to receive carcass portions that are astraddle of the backbone as the roller advances.

7. The hog carcass splitter in claim 6 characterized in that said roller is movable past said recess forming means as said roller is advanced with said cutter.

8. The hog carcass splitter in claim 1 characterized by said upright track being parallel to said upright guide.

9. The hog carcass splitter in claim 1 characterized by said guide being at a small acute angle to vertical.

10. The hog carcass splitter in claim 9 wherein said angle is about 8°.

11. The hog carcass splitter in claim 8 characterized by said guide and said track being at a small acute angle to vertical.

12. The hog carcass splitter in claim 1 characterized by said carriage including ways, said cutter including a cutter motor, said motor being mounted on and movable on said ways toward and away from said guide, and motive means between said carriage and said cutter motor for extending said cutter toward said guide and retracting it therefrom.

13. The hog carcass splitter in claim 1 characterized by means to stop said cutter a predetermined spacing from said retainer stop sufficient to sever the carcass backbone without splitting the skin.

14. The hog carcass splitter in claim 13 wherein said spacing is about an inch.

15. The hog carcass splitter in claim 9 characterized by means to stop said cutter a predetermined spacing of about an inch from said retainer stop, to cause severing of the carcass backbone without splitting the skin.

* * * * *